United States Patent [19]

Sekiguchi

[11] 4,047,109
[45] Sept. 6, 1977

[54] DRIVE-IN THEATER AUDIO SYSTEM

[76] Inventor: Kiichi Sekiguchi, 1-6-50-401 Akabanedai, Kitaku, Tokyo, Japan

[21] Appl. No.: 611,635

[22] Filed: Sept. 9, 1975

[30] Foreign Application Priority Data

Sept. 10, 1974 Japan .................. 49-103523

[51] Int. Cl.$^2$ .................................. H04H 1/00
[52] U.S. Cl. ........................ 325/54; 325/308; 325/371; 179/1 DD
[58] Field of Search ............... 325/54, 365, 312, 371, 325/308; 343/788, 711, 712, 713, 715; 179/1 DD; 178/DIG. 13

[56] References Cited

U.S. PATENT DOCUMENTS

| | | | |
|---|---|---|---|
| 2,218,830 | 10/1940 | Rose | 325/365 |
| 2,237,260 | 4/1941 | McDonald | 325/365 |
| 2,520,811 | 8/1950 | Reid | 325/365 |
| 2,581,983 | 1/1952 | Thompson | 325/365 |
| 2,851,537 | 9/1958 | Rosenberg | 325/54 |
| 2,880,416 | 3/1959 | Munzig | 325/365 |
| 2,979,607 | 4/1961 | Herzfeld | 325/54 |
| 3,131,351 | 4/1964 | Herzfeld | 325/54 |
| 3,518,681 | 6/1970 | Kiepe | 343/788 |

*Primary Examiner*—Benedict V. Safourek
*Assistant Examiner*—Michael A. Masinick
*Attorney, Agent, or Firm*—Krass & Young

[57] ABSTRACT

A drive-in movie theater audio system provides sound to the patrons over their car radios and connects to each radio through a novel lead-in which couples the car radio antenna to a transmission bus connected to a central broadcast band transmitter. The lead-in employs a pair of elongated wire sections supported parallel to one another to capacitively couple the broadcast band signal to the car antenna.

4 Claims, 8 Drawing Figures

DRIVE-IN THEATER AUDIO SYSTEM

BACKGROUND OF THE INVENTION

1. Field of the Invention

This invention relates to lead-in wires for coupling audio modulated, broadcast band signals carried on a transmission line to car radios in a drive-in movie theater system and more particularly to such a lead-in which prevents audio disturbances resulting from interference by broadcast band signals picked up by the transmission line.

2. Prior Art

Most present drive-in movie theaters employ sound systems in which an audio signal from the film sound track is carried to in-car speakers or earphones through wire.

It has previously been proposed to transmit the audio signal to special receivers located in the car but the high cost of these receivers renders this solution uneconomical. It has also been proposed to broadcast a special signal which would be picked up by the patron's car radios but legal restrictions on such broadcasts have rendered this approach impractical.

Systems have also been proposed wherein the patron's car radio receivers are directly wired to a broadcast band transmitter modulated by the audio signal from the sound track. Connection is achieved by attaching a lead-in wire, coupled at one end to a transmission line carrying the audio modulated signal, directly to the car antenna with an alligator clip or the like. This system is highly susceptible to interference caused by strong broadcast band radio signals picked up by the transmission line, or the lead-in wire, which effectively act as extensions of the receiver antenna. These extraneous signals interfere with the audio modulated sound track signals to produce a beating sound in the audio output of the receiver.

SUMMARY OF THE INVENTION

This invention is directed to an improved form of lead-in wire for connecting a car antenna to a transmission line carrying a broadcast band signal modulated with sound track audio for use in a drive-in movie theater. Broadly, the invention involves forming the lead-in wire in such a way that the audio signal on the transmission line is capacitively coupled with the antenna. This capacitive coupling effectively decouples any extraneous broadcast signals which may be picked up by the transmission line or lead-in wire, but strongly couples the relatively high amplitude sound track modulated broadcast band signal carried by the transmission line. The capacitive coupling takes the form of a pair of wire sections supported parallel to one another, in close proximity, but electrically insulated from one another. One of the wire sections is connected to the transmission line and the other wire section is either electrically connected to the antenna, by an alligator clip or the like, or, in an alternative embodiment of the invention, actually forms a section of the antenna.

This invention completely eliminates the beating sound disturbance and provides a practical technique for using car radios as sound systems in drive-in theaters.

This invention is economical since it does not require any special equipment for receiving sound such as an in-car speaker or an earphone. The lead wire costs only a small fraction of the in-car speaker and allows the patron to control sound qualities and volume. This invention eliminates the need for speaker stands and thereby allows cars to be more closely spaced than in a conventional drive-in theater. It allows the property to be used for other purposes, such as a parking area, during the day. The nuisance of bringing the in-car speaker into the car is also eliminated for the patron.

The following detailed description of three embodiments of the invention for use with three different types of car antenna makes reference to the accompanying drawings in which.

Figure 1:
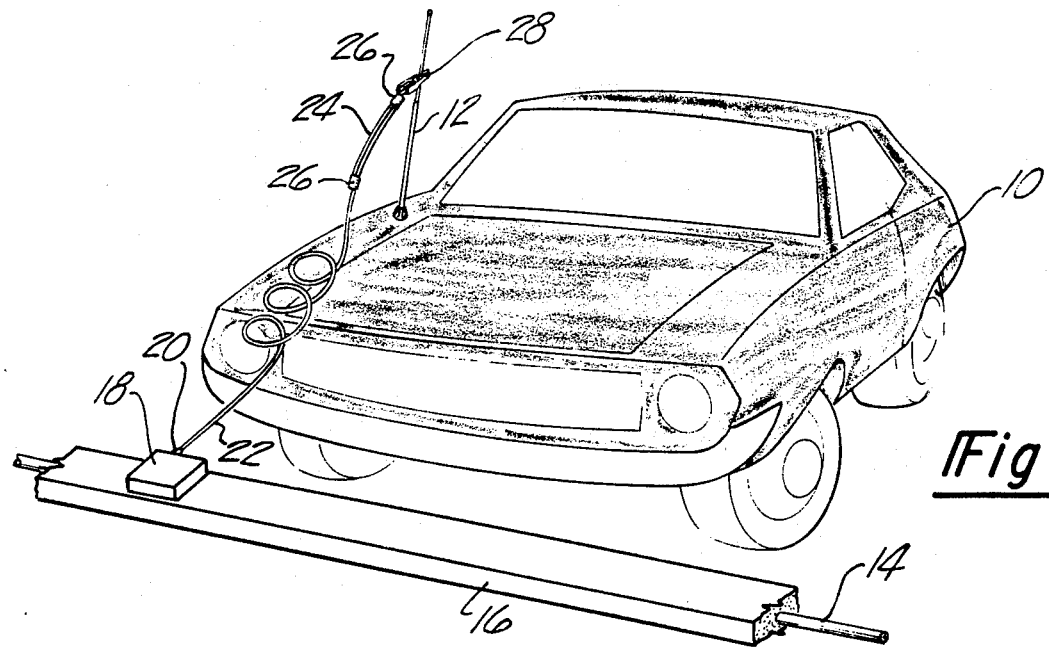
FIG. 1 is a perspective view of a lead-in formed in accordance with the preferred embodiment of the invention coupling a transmission line to an automobile radio antenna.
Figure 2:
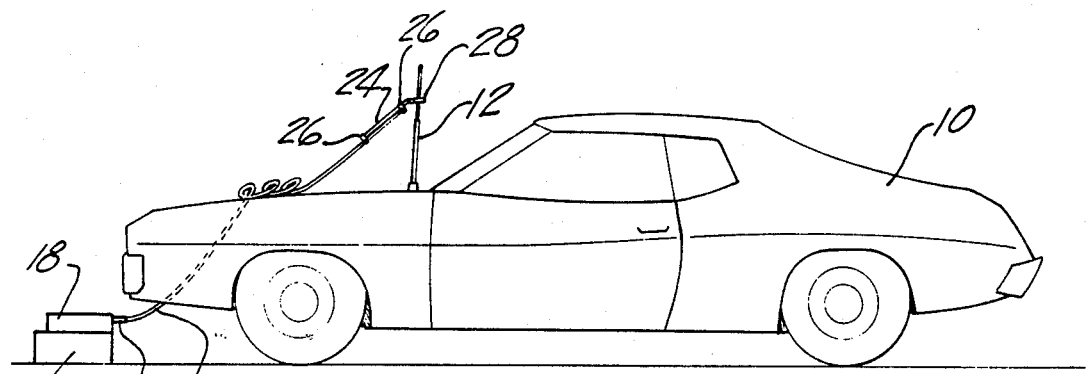
FIG. 2 is a side view of the embodiment of FIG. 1.
Figure 3:
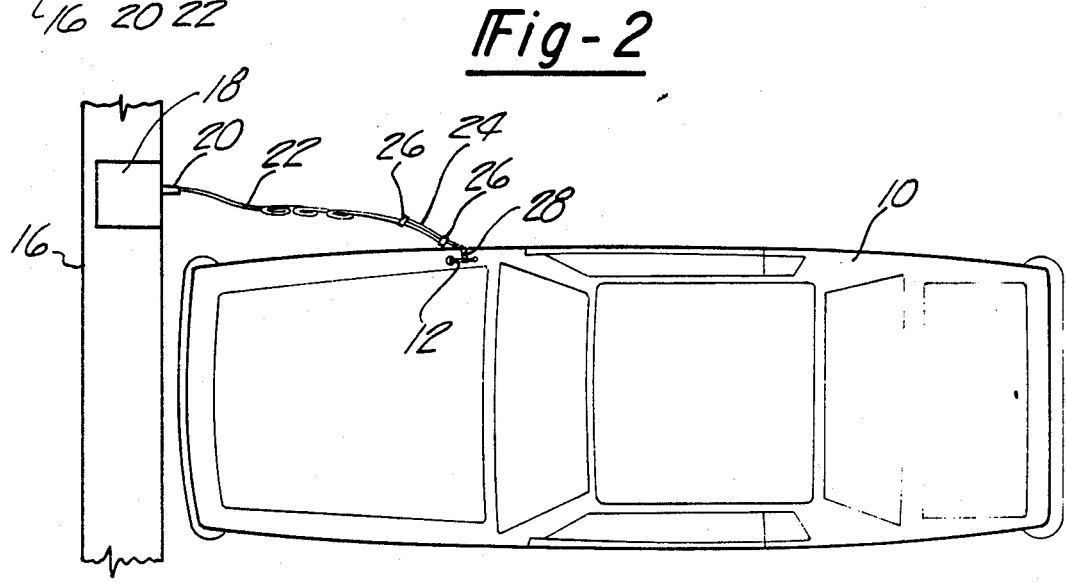
FIG. 3 is a top view of the embodiment of FIG. 1.
Figure 4:
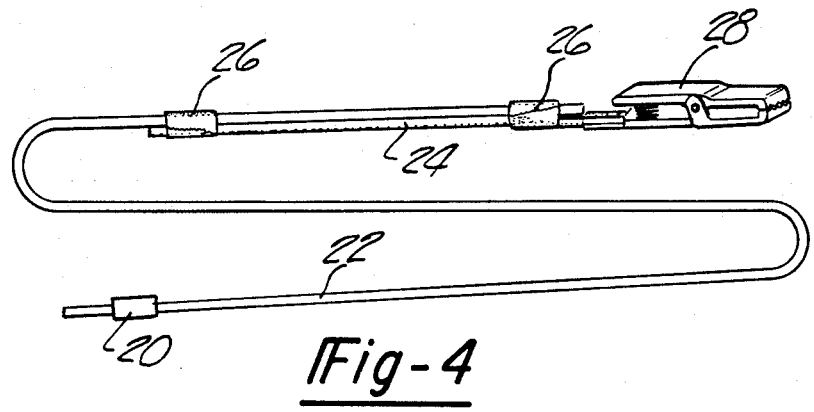
FIG. 4 is a detailed view of the lead-in wire used with the embodiment of FIG. 1.

Referring to the drawings, the first embodiment of the invention is utilized with an automobile 10 having a normal telescoping vertical antenna 12 extending upwardly from one corner of the rear of the automobile hood area.

An audio modulated broadcast band signal (between 550–1650 Kc) is carried on a transmission 14 which is coupled at some point to a transmitter associated with the film projection apparatus (not shown). The transmission line passes through a body 16 supported on the ground forward of the vehicle which carries a junction box 18. The box 16 may act as a forward stop to position the vehicle.

The junction box 18 may carry a suitable impedance matching network which electrically connects to the transmission line 14. The junction box 18 also contains a female jack for receiving the male plug 20.

An elongated electric wire 22 is electrically connected to the male plug to receive the signals carried on the transmission line 14 when plugged into the junction box 18. The wire 22 is flexible and insulated and its far end is supported in parallel alignment to a second wire section 24. The ends of the two wire sections 22 and 24 are retained together by a pair of wrappings of insulated tape 26. The lengths joined together are preferably approximately 30 centimeters in length.

The wire section 24 has an alligator clip 28 on its end which connects to the car antenna 12.

When the car radio is tuned to the frequency of the signal transmitted over the line 14, the radio will reproduce the modulating audio signal. The capacitive coupling between the parallel sections of the wires 24 and 26 will effectively decouple any wireless broadcast signals which might otherwise be picked up by lead wire 22 or the transmission line 14, acting as extensions of the receiver antenna 12.

Figure 5:
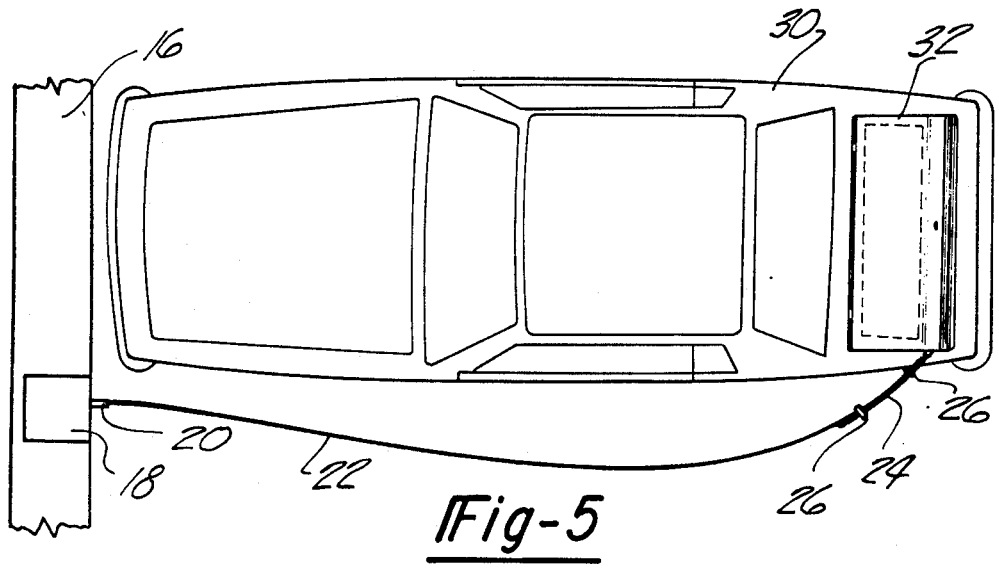
FIG. 5 is a top view of a second embodiment of the invention used with an automobile having a trunk antenna.
Figure 6:
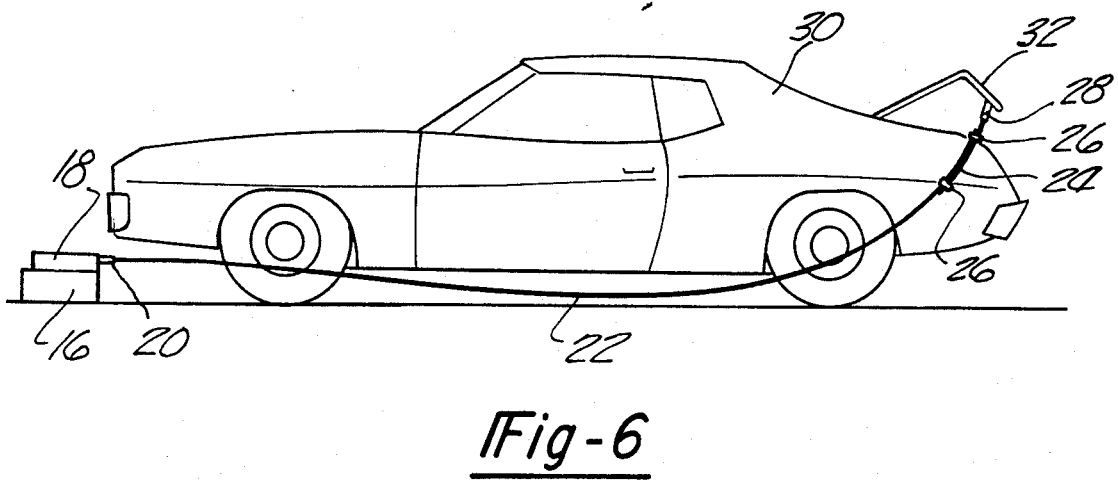
FIG. 6 is a side view of the embodiment of FIG. 5.

FIGS. 5 and 6 illustrate the invention as it is employed with an automobile 30 having an antenna supported in its trunk lid 32. The lead-in wire is of the same type and the alligator clip 28 attaches directly to the wire in the trunk lid.

Figure 7:
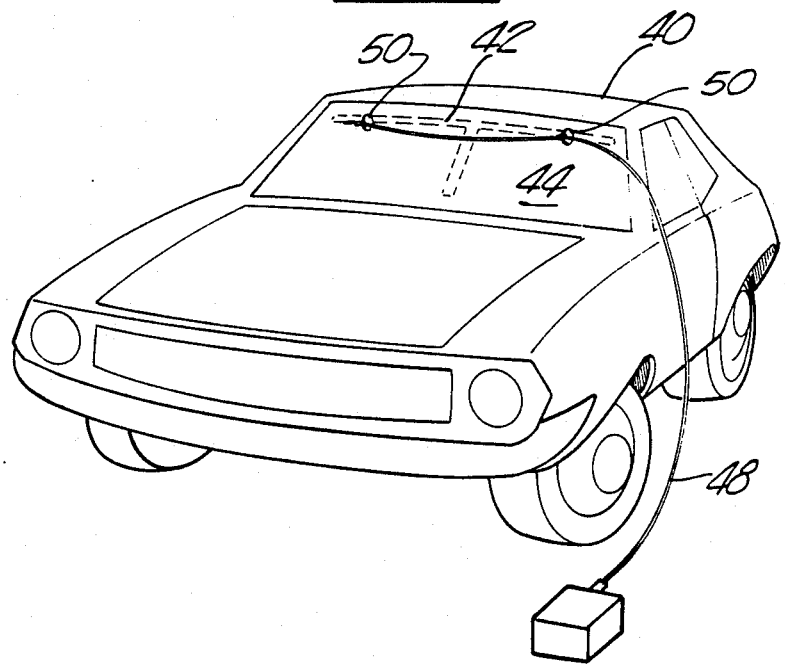
FIG. 7 is a perspective view of an alternative embodiment of the lead-in wire coupled to an automobile having a windshield antenna.
Figure 8:
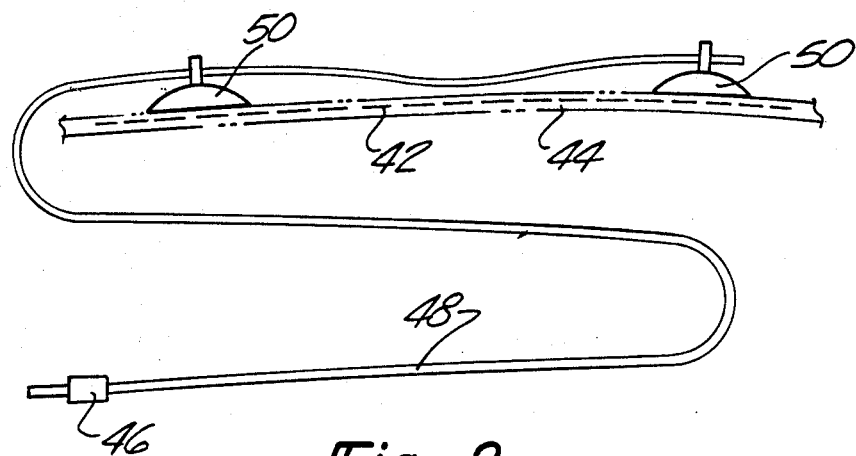
FIG. 8 is a sectional view through the windshield of FIG. 7 illustrating the coupled lead-in wire.

FIGS. 7 and 8 illustrate an alternate embodiment of the invention for use with an automobile 40 having a transparent antenna 42 formed within its windshield 44. In this case the lead-in takes the form of a male plug 46 adapted to be coupled to the transmission line connecting to an elongated wire 48 which has a pair of spaced suction cups 50 affixed adjacent to its far end. The length of wire between the suction cups may be about 30 centimeters. The suction cups are attached to spaced points on the exterior of the windshield so that the wire section between them extends parallel to the windshield antenna 42. The same sort of capacitive coupling is achieved by this arrangement as by the arrangement of the other embodiments.

Having thus described my invention, I claim:

1. In a system for use in a drive-in theater for reproducing audio sound in plurality of vehicles having broadcast band radio receivers including a central broadcast band transmitter and a wired circuit connected to the output of the transmitter and extending in the vicinity of the vehicles, an improved form of lead-in for connecting the wired circuit to the radio receiver of a vehicle, comprising: a pair of elongated, flexible conductor sections supported in closely spaced parallel relationship to one another, and insulated from one another, one of the conductors being connected to the said wired circuit and the other conductor being connected to the antenna circuit of the vehicle radio to capacitively couple a transmitter signal to the vehicle radio without strong coupling of other broadcast band signals.

2. The system of claim 1 wherein the wire section which connects to the antenna circuit of the vehicle radio carries an alligator clip on its other end.

3. The system of claim 1 wherein one of the elongated conductor sections is formed by a portion of the vehicle radio antenna.

4. The system of claim 3 wherein the radio receiver has an antenna supported on the windshield of the vehicle and acting as the conductor section connected to the antenna circuit of the vehicle radio and the elongated conductor section connected to the wire circuit is attached to the exterior of the windshield by a pair of suction cup.

* * * * *